United States Patent Office 3,448,877
Patented June 10, 1969

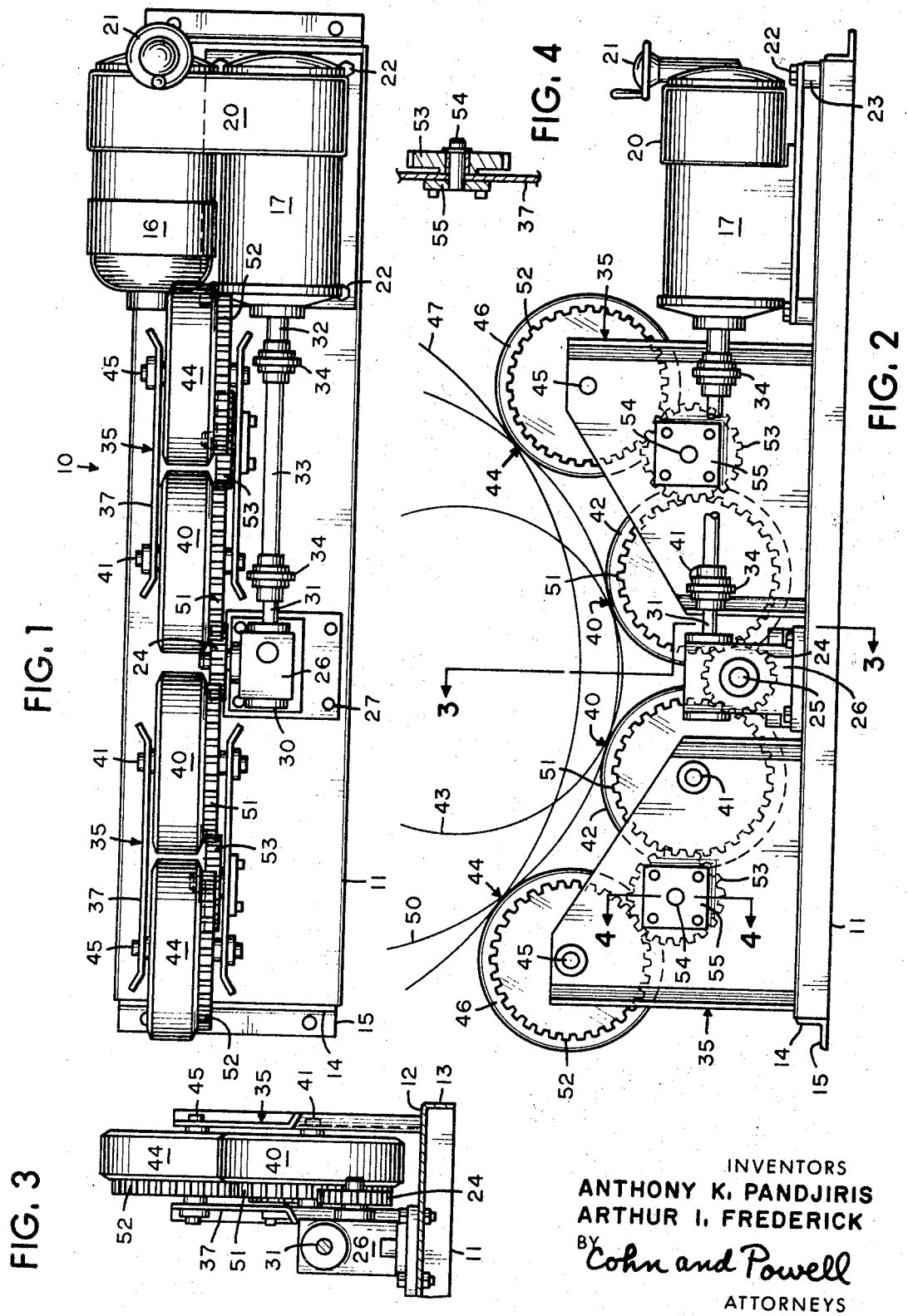

3,448,877
TURNING ROLL ASSEMBLY
Anthony K. Pandjiris, St. Louis, and Arthur I. Frederick, Webster Groves, Mo., assignors to The Pandjiris Weldment Co., St. Louis, Mo., a corporation of Missouri
Filed Aug. 22, 1966, Ser. No. 573,968
Int. Cl. B65g 7/10
U.S. Cl. 214—340                                    2 Claims

ABSTRACT OF THE DISCLOSURE

A turning roll assembly for supporting and rotating workpieces of different dimensions having a first wheel and a second wheel rotatively mounted on a support means at each side of a drive gear defining a fixed drive axis. The pair of first wheels are disposed in side-by-side relation and support a workpiece. The pair of second wheels are located outwardly of the pair of first wheels and support the same or a larger workpiece. A driven gear is connected to and rotatable with each of the wheels, the driven gears of the first wheels meshing with the common drive gear. An idler gear meshes with both driven gears of each pair of associated first and second wheels. The common drive gear positively drives the driven gears of both pair of associated first and second wheels to rotate the wheels in the same direction and turn the supported workpiece.

---

This invention relates generally to improvements in a turning roll assembly, and more particularly to an improved roll assembly adapted to support workpieces of different dimensions.

An important objective is achieved by the provision of a turning roll assembly in which a positive drive member defines a fixed transverse drive axis, and in which a first wheel and a second wheel are rotatively mounted on support means at each side of the drive axis, the first wheels being disposed in side-by-side relation and adapted to support a workpiece, and the second wheels being disposed outwardly of the first wheels and adapted to support the same workpiece or the larger workpiece. A positive drive means interconnects the first wheel and the second wheel at each side of the drive axis with each other and with the drive member to rotate the wheels in the same direction and turn the supported workpiece.

Another important objective is afforded by the structural arrangement in which the first and second wheels have their rotative axes fixed relative to the support means.

Still another important objective is realized by the structural arrangement in which the positive drive member and drive means are operatively interconnected gearing.

An important objective is attained by the provision of a toothed, positive driven member drivingly rotatable with each wheel on the wheel axis, and by the provision of means drivingly and positively interconnecting the toothed driven members of each pair of associated first and second wheels.

Another important objective is provided by the structural arrangement in which the positive drive member is a drive gear, and the positive drive means includes a pair of gear trains having a common input gear provided by the said drive gear, each gear train including driven gears rotatively connected to the first wheel and to the second wheel on the wheel axes of one pair of associated first and second wheels.

Yet another important objective is achieved by the positioning of the second wheels so that their top level is disposed above the top level of their associated first wheels to provide safety outrigger wheels for a workpiece supported on the first wheels which catch and drive the workpiece when tipped to one side of the first wheels.

An important objective is afforded by the provision of an idler gear in each gear train which operatively interconnects the associated first and second wheels, the idler gear having its rotative axis fixed relative to the support means and disposed substantially parallel to and between the rotative axes of the associated first and second wheels.

Another important object is realized in that the positive drive means includes a driven gear rotatively connected to each of the first and second wheels, the driven gears of the first wheels meshing with the common drive gear, and by the provision of an idler gear meshing with both driven gears of each pair of associated first and second wheels, the idler gear having its rotative axis fixed relative to the support means and disposed substantially parallel to and between the rotative axes of the associated first and second wheels. The common drive gear positively drives the driven gears of both pair of associated first and second wheels to rotate the wheels in the same direction and turn the supported workpiece.

A further important objective is attained by constructing the support means of transversely spaced plates, by mounting the first and second wheels rotatively to and between the spaced plates, and by disposing the common drive gear and the positive drive means between the spaced plates. The idler gears of the positive drive means are rotatively mounted to the plates.

An important object is to provide a turning roll assembly that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawing, in which:

FIG. 1 is a top plan view of the powered turning roll assembly;

FIG. 2 is a front elevational view thereof;

FIG. 3 is a cross-sectional view as taken along staggered line 3—3 of FIG. 2; and FIG. 4 is a cross-sectional view taken on line 4—4 of FIG. 2.

Referring now by characters of reference to the drawings, it is seen that the powered turning roll assembly generally indicated by 10, includes a base 11 of inverted U-shaped configuration having a flat upper wall 12 and depending opposed side walls 13. End angles 14 enclose the base ends, the end angles 14 having horizontally extending foot flanges 15.

The power unit is mounted on base 11, the power unit including an electric motor 16, the drive shaft of which is connected to a speed-reducing mechanism 17 through a drive connection enclosed by housing 20. A control wheel 21 is operatively connected to the drive connection between the motor 16 and the speed-reducing mechanism 17 so as to obtain an adjustment of the degree of speed step-down from motor 16 to the speed-reducing mechanism 17. Various types of electric motors can be utilized, as for example, electronic variable speed motors and standard constant speed motors. As is best seen in FIGS. 1 and 2, the speed-reducing mechanism 17 is mounted to the upper base wall 12 by a plurality of bolts 22 with spacers 23 therebetween.

A drive gear 24, constituting a positive drive member, is keyed to a drive shaft 25 journalled in a standard 26. The standard 26 is fixed by bolts 27 to the upper wall 12 of base 11.

A gear box 30 is attached to standard 26. The gearing (not shown) in box 30 operatively interconnects drive shaft 25 to input shaft 31. The output shaft 32 of speed-reducing mechanism 17 is operatively connected to input shaft 31 by an intermediate shaft 33 attached by couplings 34.

The turning roll assembly includes a pair of pedestals generally indicated by 35, constituting support means, located on opposite sides of the drive gear 24. Each pedestal 35 includes a pair of transversely spaced, upstanding plates 37 fixed to the upper base wall 12. A first turning wheel 40 is rotatively mounted by an axle 41 between the plates 37 of each pedestal 35. The rotative axes of axles 41 are located in parallel relation with the axis of drive gear 24. The first turning wheels 40 are of the same size, and are provided with rubber tires 42 about their peripheries. In the preferred construction, the rotative axes of first turning wheels 40 are located in the same horizontal plane above the rotative axis of drive gear 24. These first turning wheels 40 support and turn a workpiece 43, such as a tank, within a range of sizes.

Rotatively mounted on and carried by each of the pedestals 35 is a second turning wheel 44. Specifically, each second wheel 40 is located between the spaced plates 37 and is mounted on an axle 45. The rotative axis of each second turning wheel 44, as defined by axle 45, is located in parallel relation with the axis of the drive gear 24 and with the rotative axis of the first wheel 40 mounted on the same pedestal 35. It will be noted that the associated first wheel 40 and second wheel 44 mounted on the same pedestal 35 have their rotative axes fixed and are located in side-by-side relation.

The second turning wheels 44 are of the same size, and are provided with rubber tires 46 about their periphery. These second wheels 44 are of the same size as the first wheels 40 in the present embodiment. The rotative axes of the second wheels 44 are located outwardly of and upwardly from the rotative axes of the first wheels 40. The rotative axes of the second wheels 44 are located in the same horizontal plane. As will later appear, the second turning wheels 52 serve to support and rotate a workpiece 47, within a wide range of sizes, larger than the workpiece 43 supported and rotated by the first turning wheels 40. Importantly, the present turning roll assembly will enable all four turning wheels 40 and 44 to support and rotate the same workpiece 50.

A positive drive means interconnects the associated first and second wheels 40 and 44 at each side of the drive axis with each other and with the drive gear 24 to rotate the wheels 40 and 44 in the same direction and turn the supported workpiece. The positive drive means includes a driven gear 51 rotatively connected to each of the first wheels 40 at the wheel axis defined by axle 41, and includes an identical driven gear 52 rotatively connected to each of the second wheels 44 at the wheel axis defined by the axle 45.

The driven gears 51 and 52 are operatively connected to their coacting first and second wheels 40 and 44 respectively by being bolted, welded or otherwise secured to the wheels. Each of the driven gears 51 mesh with the common drive gear 24. An idler gear 53 meshes with both driven gears 51 and 52 of each pair of associated first and second wheels 40 and 44, the idler gear 53 having its rotative axis fixed relative to the support means and disposed substantially parallel to and between the rotative axes of the associated first and second wheels 40 and 44. The idler gears 53 are identical.

The mounting of the idler gears 53 is perhaps best shown in FIG. 4. Specifically, each idler gear 53 is rotatively mounted on a stub shaft 54 carried by a plate 55 fixed to one of the pedestal plates 37.

It will be understood that the common drive gear 24 and the positive drive means including the driven gears 51 and 52 and the idler gears 53 are disposed between the spaced pedestal plates 37.

From the above description, it will be apparent that the positive drive means includes a pair of gear trains having a common input drive gear 24. Each gear train includes a driven gear 51 meshing with the drive gear 24, an idler gear 53 meshing with the driven gear 51, and a second driven gear 52 meshing with the idler gear 53. The common drive gear 24 positively drives gears 51 and 52 of both pair of associated first and second wheels 40 and 44, to rotate the wheels 40 and 44 in the same direction and to turn the supported workpiece.

Because of the particular structural arrangement of the first and second wheels 40 and 44, and the driving connection between pairs of associated wheels 40 and 44, it will be understood that the second wheels 44 constitute safety outrigger wheels for a workpiece 43 supported on first wheels 40 which can catch and drive the workpiece 43 if tipped to one side of the first wheels 40.

It is thought that the functional advantages of the powered turning roll assembly 10 have become fully apparent from the foregoing detailed description of parts, but for completeness of disclosure, the usage of such turning roll assembly 10 will be briefly described. It will be assumed that the powered turning roll assembly 10 is utilized in conjunction with a cooperating idler roll assembly (not shown) in the conventional manner, and it is desired to support and turn a cylindrical workpiece in a horizotal position. The present turning roll assembly 10 is particularly advantageous to support and rotate cylindrical tanks during welding of annular seams. For the purpose of illustration the workpieces 43, 37 and 50 in FIG. 2 are shown as cylindrical tanks.

A workpiece 43, within a wide range of sizes, can be supported and rotated by the first turning wheels 40, such first wheels 40 being driven by the interengagement of the driven gears 51 with the common input drive gear 24. The first turning wheels 40 support and rotate the workpiece 43.

If for any reason the workpiece 43 were to tip to one side of the first wheels 40, the workpiece 43 would fall against and engage one of the safety outrigger wheels provided by the second turning wheels 44. Because the second turning wheel 44 is rotating in the same direction as the first turning wheel 40, it will be understood that the safety outrigger wheel will catch and rotate the workpiece 43 also.

The second turning wheels 44 and their drive connection expand the workpiece diameter capacity of the turning roll assembly. A larger workpiece 47, within a larger range of sizes compared to the workpiece 43, is supported and rotated by the second turning wheels 44. The second turning wheels 44 are driven in the same direction. For example, each second turning wheel 44 has its drivingly connected driven gear 52 meshing with an idler gear 53, which in turn meshes with the driven gear 51 operatively meshing with the common input drive gear 24.

Under some circumstances, all four turning wheels 40 and 44 will support the same workpiece 50, and all such wheels 40 and 44, rotating in the same direction, will turn the workpiece 50.

The present turning roll assembly 10 has the axes of its turning wheels 40 and 44 fixed. The turning roll assembly is ready for immediate use without any adjustment as to position of the turning wheels 40 and 44 and without any adjustment of the drive connection between such wheels. This turning roll assembly does not rely on any frictional drive between turning rolls and the rubber tires 42 and 46 carried by the turning wheels 40 and 44, but on the contrary, have a positive interconnecting drive connection. Consequently, this turning roll assembly can be designed for extremely heavy loads.

We claim as our invention:
1. In a turning roll assembly for supporting and rotating workpieces of different dimensions:
 (a) a base,
 (b) support means operatively immovably fixed to the base,
 (c) drive gear defining a fixed transverse drive axis,
 (d) means rotating the drive member,

(e) a first wheel and a second wheel rotatively mounted on the support means at each side of the said drive axis, the first and second wheels having their rotative axes fixed relative to the support means, (f) the said first wheels mounted on the support means disposed in side-by-side relation and adapted to support a workpiece, (g) the said second wheels mounted on the support means disposed outwardly of the said first wheels and adapted to support the same said workpiece or a larger workpiece, (h) the workpiece being supported on rotating support surfaces at support points disposed inwardly of the axes of rotation of said second wheels, (i) a driven gear rotatively connected to each of the first and second wheels, (j) the driven gears of the said first wheels meshing with the drive gear, which is common to both driven gears, independently of the rotating support surfaces, (k) an idler gear meshing with both driven gears of each pair of associated first and second wheels independently of the rotating support surfaces, the idler gear having its rotative axis fixed relative to the support means and disposed substantially parallel to and between the rotative axes of the associated first and second wheels, and (l) the common drive gear positively driving the driven gears of both of said associated first and second wheels to rotate the wheels in the same direction and turn the supported workpiece.

2. A turning roll assembly for supporting and rotating workpieces of different dimensions in claim 1, in which:

(m) the support means includes transversely spaced plates, (n) the first and second wheels are rotatively mounted to and between the spaced plates, (o) the common drive gear, the driven gears and idler gears are disposed between the spaced plates, and (p) the idler gears are rotatively mounted to the plates.

References Cited

UNITED STATES PATENTS

| | | | |
|---|---|---|---|
| 3,363,786 | 1/1968 | Pandjiris et al. | 214—340 |
| 384,220 | 6/1888 | Treat. | |
| 1,836,272 | 12/1931 | Mulvany. | |
| 3,258,144 | 6/1966 | Reschke | 214—340 |

HUGO O. SCHULZ, *Primary Examiner.*